US008029034B2

(12) United States Patent
Russi

(10) Patent No.: US 8,029,034 B2

(45) Date of Patent: Oct. 4, 2011

(54) HAND TOOL FOR LIFTING AND MOVING A CAR STOP

(76) Inventor: Richard B. Russi, Kerrville, TX (US)

( * ) Notice: Subject to any disclaimer, the term of this patent is extended or adjusted under 35 U.S.C. 154(b) by 308 days.

(21) Appl. No.: 12/271,951

(22) Filed: Nov. 17, 2008

(65) Prior Publication Data

US 2010/0123326 A1 May 20, 2010

(51) Int. Cl.
*B65G 7/12* (2006.01)

(52) U.S. Cl. ........................................................ 294/15

(58) Field of Classification Search .................... 294/15, 294/17, 26, 92, 158; 254/120, 121, 131; 404/7, 25, 26

See application file for complete search history.

(56) References Cited

U.S. PATENT DOCUMENTS

| | | | | |
|---|---|---|---|---|
| 124,749 | A | | 3/1872 | Koontz |
| 801,342 | A | | 10/1905 | Schultz |
| 1,083,808 | A | | 1/1914 | Dunson |
| 2,347,310 | A | | 12/1943 | Zuber |
| 2,409,932 | A | | 6/1945 | Dostal |
| 2,427,104 | A | | 9/1947 | Hosler |
| 2,594,791 | A | | 4/1952 | Motl |
| 2,613,978 | A | | 10/1952 | Marulli |
| 168,534 | A | | 1/1953 | Council |
| 2,967,730 | A | | 1/1961 | Vann |
| 3,720,406 | A | * | 3/1973 | Artz ............................. 267/139 |
| 3,837,622 | A | | 9/1974 | Gale |
| 4,183,503 | A | * | 1/1980 | Ward ............................ 254/131 |
| D267,074 | S | * | 11/1982 | Feighery .......................... D8/13 |
| 4,978,103 | A | * | 12/1990 | Moisan ......................... 254/131 |
| 4,982,987 | A | | 1/1991 | Riggins |
| 5,137,314 | A | | 8/1992 | Gunter |
| 5,314,220 | A | * | 5/1994 | Clement ......................... 294/10 |
| 6,142,547 | A | * | 11/2000 | Bowerman .................... 294/150 |
| 6,152,505 | A | * | 11/2000 | Coyne ............................ 294/16 |
| 6,386,608 | B1 | | 5/2002 | Eister |
| 6,422,623 | B1 | | 7/2002 | Thomas |
| 6,752,441 | B1 | * | 6/2004 | Morris ............................ 294/12 |
| 7,354,084 | B2 | | 4/2008 | Freilling |
| 2004/0217609 | A1 | | 11/2004 | Freiling et al. |
| 2007/0210595 | A1 | * | 9/2007 | Quiles et al. .................... 294/17 |

* cited by examiner

*Primary Examiner* — Saul Rodriguez
*Assistant Examiner* — Stephen Vu
(74) *Attorney, Agent, or Firm* — John C. Cave; Gunn, Lee & Cave, PLC

(57) ABSTRACT

A hand tool for lifting and moving a car stop, the tool having a handle, a rod member with a main section perpendicularly fixed to the handle, and an engagement section angled relative to the main section. A bracing member is fixed to the rod member for prevention of movement of the car stop relative to the rod member. According to one alternative embodiment of the invention, a pointed nosepiece is fixed to the rod member and may be used for clearing the retaining holes of a car stop of debris.

17 Claims, 3 Drawing Sheets

HAND TOOL FOR LIFTING AND MOVING A CAR STOP

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to hand tools. More specifically, the present invention is a hand tool that allows a worker to quickly lift one end of a car stop and, in combination with a second worker lifting another end, move the car stop to a new location.

2. Description of the Related Art

A car stop, or parking curb, is a durable, elongated block—typically concrete or heavy plastic—that is tall enough to stop most non-commercial vehicles travelling at speeds typical during the act of parking. These car stops, which typically have beveled surfaces angled relative to the parking surface, catch the tires of the vehicle and impede further movement. In addition, in order to effectively resist the repetitive impact from parking vehicles, car stops typically include at least two retaining holes from the top surface through the body of the car stop to the bottom surface positioned near the opposite ends of the car stop. Lag screws or spikes may be disposed through the holes and into the parking lot surface in order to prevent theft and/or inadvertent repositioning of the car stops.

Car stops are most often positioned at the interior end of a parking space—that is, the end toward which the vehicle is advanced—to limit the movement of a car past a predetermined position within the space. For example, for a parking space abutting a sidewalk, a car stop may be placed proximal to the sidewalk to limit how far a car moving into the space can advance, thus protecting the front of the car if the sidewalk is particularly high or some other obstruction which could damage the car. Such placement would also protect those using the abutting sidewalk from inadvertently being hit by a car. Similarly, when two parking spaces are positioned opposite each other so that their interior ends abut, such that a car advancing into one space could impact a car already occupying the opposite space, a car stop is frequently placed at the interior end of the spaces to prevent unintentional contact of one vehicle with the already-parked vehicle.

It is frequently necessary to lift and move car stops. For example, this occurs when car stops are transported from the manufacturer to a location where they are to be placed. Likewise, car stops are moved and replace when a parking lot is resurfaced.

In order for car stops to perform the desired function, they are heavy and not readily movable. As a result, injuries to workers are not uncommon. For example, concrete car stops typically weigh between 175 and 200 pounds. Prior to the present invention, car stops were most typically lifted by hand. Setting and resetting the car stops expose fingers and toes to crushing and mutilation, as well as the possibility of a severe back injury. Moreover, because of their weight and bulkiness, significant time is required to move car stops. It may take a four-man crew a full day to set 200 car stops on an asphalt surface. By using the present invention, a four-man crew could cut that installation time to less than half a day.

Equally as important, use of the present invention will decrease the probability of a worker suffering injury as a result of the heavy lifting, which minimizes lost man-hours as well as medical expenses, which can range from hundreds of dollars for finger and toe injuries to thousands of dollars for back injuries.

Devices exist that are specifically designed for lifting concrete, masonry blocks, and other heavy objects. None of the existing devices, however, can be effectively used to lift and move a car stop. Thus, a need exists for a tool to facilitate the safe and efficient setting and resetting of car stops.

For example, U.S. Pat. No. 5,137,314 discloses a device for lifting catwalk grates that comprises an elongated bent member attached to a handle at a first end and having a pair of notched braces and a hook at a second end. The braces and hook together lock on to a grate and firmly hold the grate during the transfer process. See U.S. Pat. No. 5,137,314 col. 3 1.54 to col. 4 1.15. Furthermore, by positioning a tool at both ends of a section of grating to be moved, two workers are able to safely lift the grate section and relocate it without significant risk of injury.

U.S. Pat. No. 7,354,084 also discloses a lifting device having an elongate shaft member. A hook member is supported on a first end of the shaft member, and the substantially perpendicular configuration of the hook member permits a worker to lift heavy objects, such as concrete sidewalk slabs and the like, by supporting them on the hook member. See U.S. Pat. No. 7,354,084 FIG. 9A, FIG. 9B, FIG. 9C.

U.S. Pat. No. 6,386,608 shows a block lift for use with keystone-type blocks. The lift includes an elongated rod having a first end coupled to the top surface of a plate. The plate is positioned through an aperture in a block and turned so that it is moved under the block's bottom surface. The block may be thereafter lifted by lifting the elongated rod.

While these and other references disclose inventions that may be used for lifting heavy and cumbersome objects, none of the above inventions, taken either individually or in combination, discloses the present invention as claimed.

BRIEF SUMMARY OF THE INVENTION

The present invention is a hand tool for lifting and moving a car stop. The tool comprises a handle, a rod member having a main section perpendicularly fixed to the handle, and an engagement section angled relative to the main section. A bracing member having a crossbar and two downwardly-angled prongs is perpendicularly fixed to the rod member. According to one alternative embodiment of the invention, a pointed nosepiece is fixed to the rod member and may be used for clearing debris (e.g., leaves, dirt) from the retaining holes of a car stop.

DETAILED DESCRIPTION OF THE INVENTION

Figure 1:
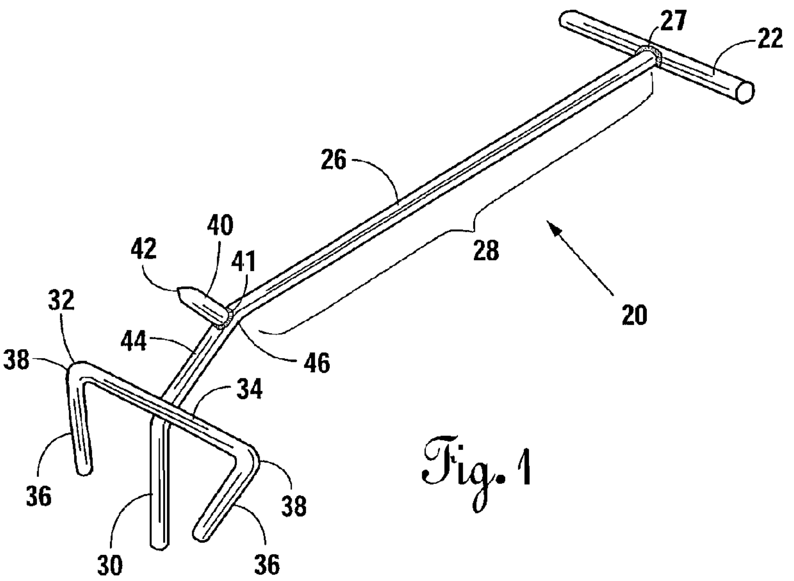
FIG. 1 is a perspective view of the preferred embodiment of the present invention.

FIG. 1 is a perspective view of the preferred embodiment of the present invention. The hand tool 20 comprises a tubular handle 22 and a cylindrical rod member 26. A main section 28 of the rod member 26 is attached to the handle 22 with a weld 27 at a position midway along the length of the handle 22 and extending perpendicularly therefrom. Preferably, the approximate angle Θ between the main section 28 and the engagement section 30 of the rod member 26 is one-hundred twenty degrees, but may vary in alternative embodiments. The rod member 26 also comprises an intermediate section 44 positioned between the main section 28 and the engagement section 30 and angled relative to each. Preferably, the main section 28, intermediate section 44, and the engagement section 30 are integrally formed from a single piece of cylindrical steel. In alternative embodiments, the main section 28, intermediate section 44 and engagement section 30 may be formed of separate lengths of steel which are then connected with welds or other means of connection.

The hand tool 20 also includes a bracing member 32 having a crossbar 34 fixed (e.g., welded) to the rod member 26 proximal to the engagement section 30. The crossbar 34 is oriented in a position perpendicular to the rod member 26 and parallel to the handle 22. As shown in FIG. 1, in the preferred embodiment, the crossbar 34 is attached to the intermediate section 44 at a position immediately adjacent the point of junction of the intermediate section 44 and the engagement section 30. However, it is anticipated that the crossbar 34 could be attached at various positions on the rod member 26.

Two prongs 36 angled relative to the crossbar 34 extend from each end 38 of the crossbar 34. In the preferred embodiment, the crossbar 34 and prongs 36 are integrally formed from a single piece of cylindrical steel. However, it is anticipated that the crossbar 34 and prongs may be formed of separate lengths of steel which are then connected with welds or other means of connection.

A cylindrical steel nosepiece 40 with a pointed end 42 extends from the rod member 26. In the preferred embodiment, the nosepiece 40 is joined to the rod member 26 with a weld 41 and extends from the intermediate section 44. However, it is anticipated that the nosepiece 40 could extend from the rod member 26 at various convenient positions.

Figure 2:
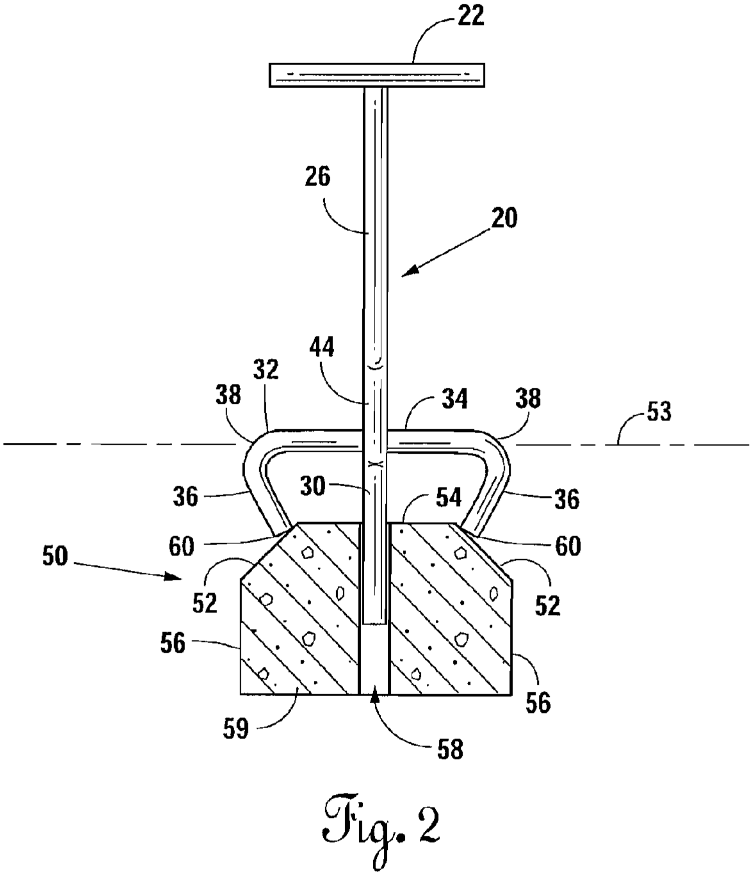
FIG. 2 is a front partial sectional elevation of the hand tool engaged with a car stop.
Figure 3:
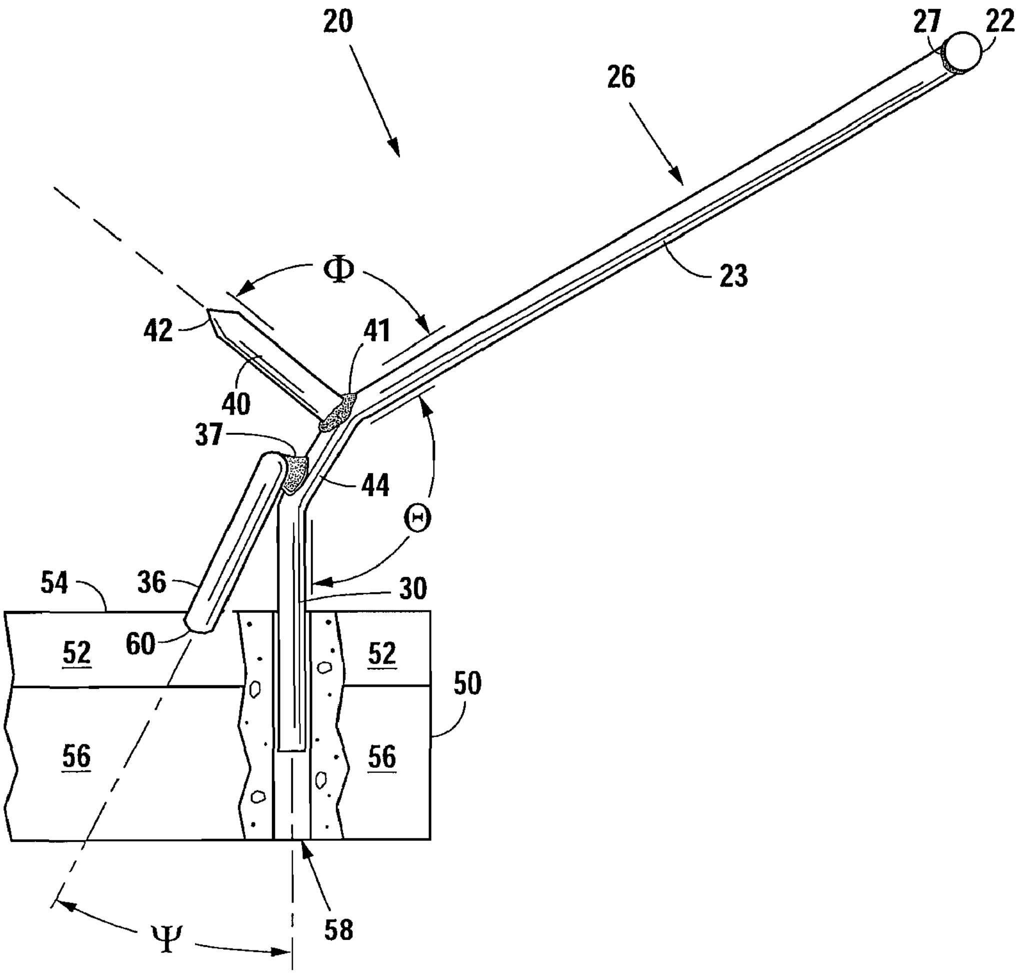
FIG. 3 is a side partial sectional elevation of the hand tool engaged with a car stop.

FIG. 2 and FIG. 3 in combination show the position of the hand tool 20 when used to move a concrete car stop 50. FIG. 2 is a front partial sectional elevation of the hand tool 20 engaged with the car stop 50. FIG. 3 is a side elevation of the hand tool 20 engaged with the car stop 50. The car stop 50 has an outer surface comprising a horizontal bottom surface 59, a horizontal top surface 54, and vertical side surfaces 56. Two beveled surfaces 52 extend from the top edge of the side surfaces 56 to the top surface 54. A retaining hole 58 is vertically disposed through the car stop 50 from the top surface 54 through the bottom surface 59. Although FIG. 2 and FIG. 3 are depicting only one end of the car stop 50, it can be appreciated that the car stop 50 has an identical opposite end having a second retaining hole.

The prongs 36 of the bracing member, which is joined to the rod member 26 with a weld 37, are preferably angled downwardly at forty-five degrees relative to the longitudinal axis 53 of the crossbar 34. However, it is anticipated that the angle could vary. Preferably (see FIG. 3), the angle Ψ formed between the prongs 34 and the longitudinal axis of the engagement section is approximately twenty degrees. However, it is anticipated that this angle Ψ could also vary.

Figure 4:
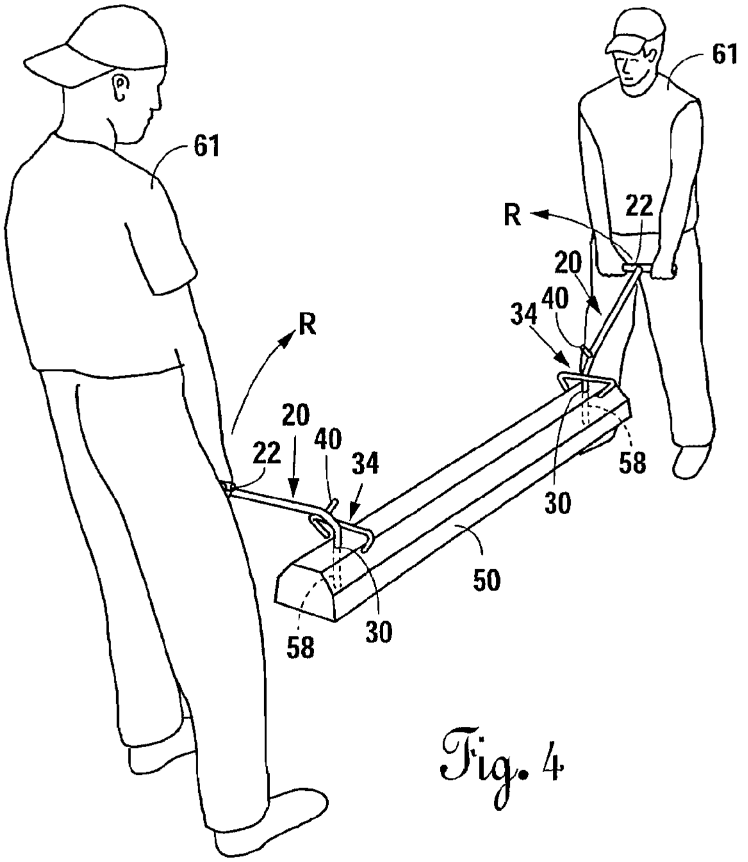
FIG. 4 shows a car stop being moved by two workers using the present invention.

FIG. 4 shows the preferred embodiment 20 in use by two workers 61 moving the concrete car stop 50. Prior to inserting the engagement end 30 of the hand tool 20 into the retaining hole 58, a worker 61 may, if necessary, clear debris from the retaining hole 58 by repeatedly disposing the nosepiece 40 into the retaining hole 58. Thereafter, one worker 61 stands at each end of the car stop 50 and positions the engagement section 30 of the hand tool 20 in the retaining hole 58. As shown in FIG. 2 and FIG. 3, when the engagement section 30 is fully inserted into the retaining hole 58, the prong ends 60 contact the beveled surfaces 52. Thereafter, each worker 61 pulls upwardly on the handle 22 to cause inward rotation of the hand tool 20 in direction R, resulting in frictional engagement of the engagement section 30 of the hand tool 20 with the car stop 50.

Figure 5:
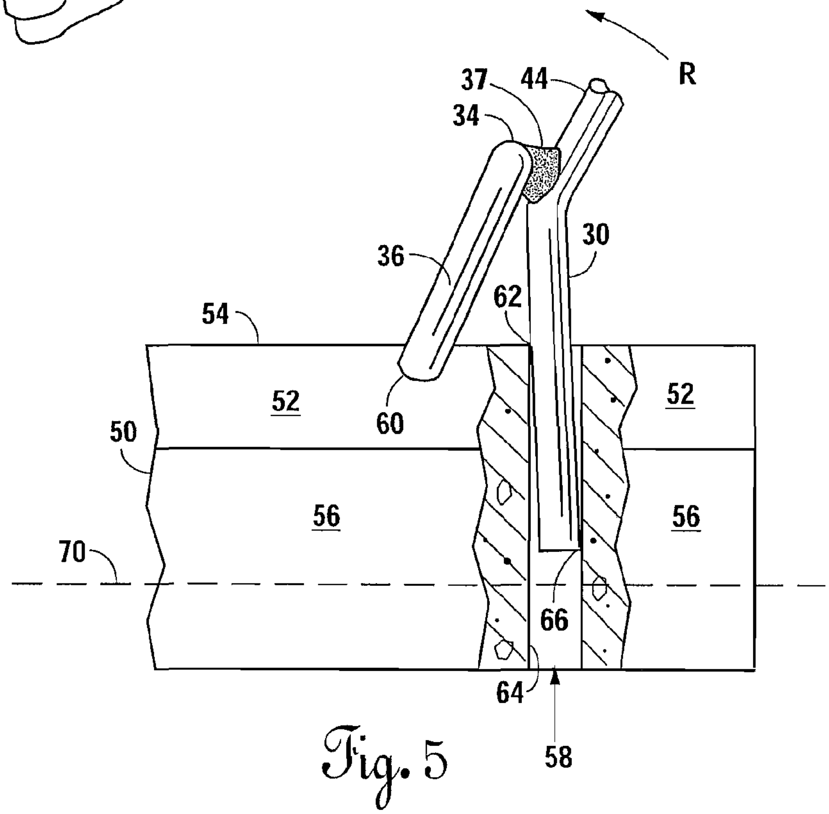
FIG. 5 is a side elevation of the engagement section frictionally engaged with the car stop.

FIG. 5 more clearly shows how the inward rotation of the hand tool 20 causes frictional engagement of the engagement section 30 with the car stop 50. As a worker 61 pulls the hand tool 20 upwardly, the engagement section 30 contacts the interior sidewall 64 of the retaining hole 58 near the top surface 54 at a first contact position 62 with a first side of the engagement section 30, while also contacting the sidewall 64 at a second contact position 66 with a second and opposite side of the engagement section 30. Preferably, the engagement section 30 is disposed far enough into the retaining hole 58 so that the end 60 of each prong 36 contacts the beveled surface 52 to stabilize and prevent rotation of car stop 50 about its longitudinal axis 70 during lifting and transport, as well as to prevent rotation of the engagement section 30 around its longitudinal axis within the retaining hole 58. Similarly, when the engagement section 30 is fully inserted into the retaining hole 58, the angle Θ between the main section 28 and the engagement section 30 of the rod member 26 is sufficient to allow the main section 28 to extend upwardly such that the handle 22 rests in a position that allows the worker 61 to grasp the handle 22 with only slight bending at the knees. Preferably, the length of the main section 28 of the rod member 26 is sufficient to allow the rod member 26 and the handle 22 to extend beyond the end of the car stop 50 such that a worker 61 can stand a short distance away from the end of the car stop 50 and comfortably grasp the handle 22. In the preferred embodiment, the length of the rod member 26 is approximately twenty inches, but this length may vary in alternative embodiments.

After relocating the car stop 50 to the preferred location, the hand tool 20 may be disengaged from the car stop 50 by no longer causing rotation of the engagement section 30 in direction R. The engagement section 30 will thus disengage from the sidewall 64 of the retaining hole 58 and allow the engagement section 30 to be withdrawn from the car stop 50.

The present invention is described above in terms of a preferred illustrative embodiment of a specifically described hand tool for relocating car stops. Those skilled in the art will recognize that alternative constructions of such an apparatus can be used in carrying out the present invention. Other aspects, features, and advantages of the present invention may be obtained from a study of this disclosure and the drawings, along with the appended claims.

I claim:

1. A hand tool for lifting and moving a car stop, the hand tool comprising:

a rod member having a main section and an engagement section angled at a first angle relative to said main section, said engagement section sized to fit into a retaining hole in said car stop;

a handle fixed to said rod member;

a crossbar fixed to said rod member; and two downwardly angled prongs extending from opposite ends of said crossbar, wherein said prongs contact an outer surface of said car stop when said engagement section is fully inserted into said retaining hole of said car stop.

2. The hand tool of claim 1 wherein said engagement section is substantially straight.

3. The hand tool of claim 1 wherein said engagement section is cylindrical.

4. The hand tool of claim 1 wherein said crossing member is welded to said rod member.

5. The hand tool of claim 1 wherein said handle is welded to said rod member.

6. The hand tool of claim 1 wherein the first angle formed by said engagement section relative to said main section is obtuse.

7. The hand tool of claim 1 wherein said rod member is steel.

8. The hand tool of claim 1 wherein said crossing member and said prongs are steel.

9. The hand tool of claim 1 wherein said handle is a hollow cylinder having open ends.

10. The hand tool of claim 1 wherein the length of said main section is sufficient to allow the rod member to extend laterally beyond the end of said car stop adjacent said retaining hole when said engagement section is inserted into said retaining hole.

11. The hand tool of claim 1 further comprising a nosepiece fixed to said rod member at a position proximal to said engagement section.

12. The hand tool of claim 11 wherein said nosepiece is pointed.

13. The hand tool of claim 12 wherein said nosepiece is welded to said rod member.

14. The hand tool of claim 1 further comprising a substantially straight intermediate section between said main section and said engagement section, said intermediate section angled at a second angle relative to said engagement section.

15. The hand tool of claim 14 further comprising a nosepiece fixed to said intermediate section.

16. The hand tool of claim 1, wherein said main section extends upwardly and laterally from said retaining hole when said engagement section is inserted into said retaining hole.

17. A hand tool for lifting and moving a car stop, the hand tool comprising:

a rod member having a main section and an engagement section angled at a first angle relative to said main section, said engagement section sized to fit into a retaining hole in said car stop;

a handle fixed to a first position of said rod member;

a bracing member fixed to a second position of said rod member to prevent or minimize movement of said car stop relative to said rod member;

wherein said bracing member comprises an at least substantially straight crossbar fixed to said rod member, said crossbar having two opposing ends and a longitudinal axis perpendicular to said rod member; and one prong at each end of said crossbar extending downwardly relative to said longitudinal axis and angled at a second angle from said main section; and wherein said prongs contact an outer surface of said car stop when said engagement section is fully inserted into said retaining hole of said car stop.

* * * * *